United States Patent
Mukherjee et al.

(10) Patent No.: US 10,133,667 B2
(45) Date of Patent: Nov. 20, 2018

(54) EFFICIENT DATA STORAGE AND RETRIEVAL USING A HETEROGENEOUS MAIN MEMORY

(71) Applicant: Oracle International Corporation, Redwood Shores, CA (US)

(72) Inventors: Niloy Mukherjee, San Jose, CA (US); Tirthankar Lahiri, Palo Alto, CA (US); Juan R. Loaiza, Woodside, CA (US); Jesse Kamp, Castro Valley, CA (US); Prashant Gaharwar, San Mateo, CA (US); Hariharan Lakshmanan, Belmont, CA (US); Dhruvil Shah, Sunnyvale, CA (US)

(73) Assignee: Orcle International Corporation, Redwood Shores, CA (US)

( * ) Notice: Subject to any disclaimer, the term of this patent is extended or adjusted under 35 U.S.C. 154(b) by 0 days.

(21) Appl. No.: 15/257,754

(22) Filed: Sep. 6, 2016

(65) Prior Publication Data
US 2018/0067853 A1    Mar. 8, 2018

(51) Int. Cl.
*G06F 12/08* (2016.01)
*G06F 3/06* (2006.01)
*G06F 17/30* (2006.01)

(52) U.S. Cl.
CPC ............ *G06F 12/08* (2013.01); *G06F 3/0604* (2013.01); *G06F 3/067* (2013.01); *G06F 3/0638* (2013.01);
(Continued)

(58) Field of Classification Search
CPC .. G06F 12/08; G06F 12/0811; G06F 12/0866; G06F 2212/222; G06F 2212/282;
(Continued)

(56) References Cited

U.S. PATENT DOCUMENTS

| 4,425,615 A | 1/1984 | Swenson et al. |
| 5,255,356 A | 10/1993 | Michelman et al. |

(Continued)

FOREIGN PATENT DOCUMENTS

| GB | 2409 301 A | 6/2005 |
| KR | 10-2010-0131054 | 12/2010 |

(Continued)

OTHER PUBLICATIONS

Loaiza, U.S. Appl. No. 13/840,811, filed Mar. 15, 2013, Office Action, dated Jan. 10, 2018.

(Continued)

*Primary Examiner* — Hiep Nguyen
(74) *Attorney, Agent, or Firm* — Hickman Palermo Becker Bingham LLP (57) ABSTRACT

Techniques related to efficient data storage and retrieval using a heterogeneous main memory are disclosed. A database includes a set of persistent format (PF) data that is stored on persistent storage in a persistent format. The database is maintained on the persistent storage and is accessible to a database server. The database server converts the set of PF data to sets of mirror format (MF) data and stores the MF data in a hierarchy of random-access memories (RAMs). Each RAM in the hierarchy has an associated latency that is different from a latency associated with any other RAM in the hierarchy. Storing the sets of MF data in the hierarchy of RAMs includes (1) selecting, based on one or more criteria, a respective RAM in the hierarchy to store each set of MF data and (2) storing said each set of MF data in the respective RAM.

20 Claims, 7 Drawing Sheets

(52) U.S. Cl.
CPC ...... *G06F 3/0647* (2013.01); *G06F 17/30289* (2013.01); *G06F 17/30312* (2013.01); *G06F 2212/1016* (2013.01)

(58) Field of Classification Search
CPC ......... G06F 2212/283; G06F 2212/286; G06F 2212/1021; G06F 3/065; G06F 3/0647; G06F 3/0604; G06F 3/0638; G06F 3/067; G06F 17/30312; G06F 17/30289; G06F 2212/1016
See application file for complete search history.

(56) References Cited

U.S. PATENT DOCUMENTS

| | | |
|---|---|---|
| 5,265,246 A | 11/1993 | Li |
| 5,717,893 A | 2/1998 | Mattson |
| 5,774,643 A | 6/1998 | Lubbers |
| 5,897,634 A | 4/1999 | Attaluri et al. |
| 5,943,689 A | 8/1999 | Tamer |
| 6,078,994 A | 6/2000 | Carey |
| 6,434,672 B1 | 8/2002 | Gaither |
| 6,457,105 B1 | 9/2002 | Spencer et al. |
| 6,526,483 B1 | 2/2003 | Cho et al. |
| 6,557,082 B1 | 4/2003 | Josten et al. |
| 6,728,823 B1 | 4/2004 | Walker et al. |
| 6,922,754 B2 | 7/2005 | Liu et al. |
| 7,031,994 B2 | 4/2006 | Lao et al. |
| 7,069,324 B1 | 6/2006 | Tiwana et al. |
| 7,159,076 B2 | 1/2007 | Madter |
| 7,165,144 B2 | 1/2007 | Choubal et al. |
| 7,272,589 B1 | 9/2007 | Guay |
| 7,290,090 B2 | 10/2007 | Madter |
| 7,461,147 B1 | 12/2008 | Mowat et al. |
| 7,496,589 B1 | 2/2009 | Jain et al. |
| 7,506,103 B2 | 3/2009 | Madter |
| 7,581,064 B1 | 8/2009 | Zedlewski |
| 7,636,814 B1 | 12/2009 | Karr et al. |
| 7,660,945 B1 | 2/2010 | Lee |
| 7,769,802 B2 | 8/2010 | Smith |
| 7,822,727 B1 | 10/2010 | Shaughnessy |
| 7,836,262 B2 | 11/2010 | Gunna et al. |
| 7,840,752 B2 | 11/2010 | Hu et al. |
| 7,904,562 B2 | 3/2011 | Takase et al. |
| 8,032,499 B2 | 10/2011 | Faerber et al. |
| 8,203,972 B2 | 6/2012 | Sauermann |
| 8,204,892 B2 | 6/2012 | Balebail et al. |
| 8,244,984 B1 | 8/2012 | Glasco et al. |
| 8,327,080 B1 | 12/2012 | Der |
| 8,359,429 B1 | 1/2013 | Sharma et al. |
| 8,370,452 B2 | 2/2013 | Harvell et al. |
| 8,392,382 B2 | 3/2013 | Marwah et al. |
| 8,489,820 B1 | 7/2013 | Ellard |
| 8,521,923 B2 | 8/2013 | Lee et al. |
| 8,583,692 B2 | 11/2013 | Ganesh |
| 8,645,337 B2 | 2/2014 | Kapoor et al. |
| 8,683,139 B2 | 3/2014 | Gaither |
| 8,832,142 B2 | 9/2014 | Marwah et al. |
| 8,868,831 B2 | 10/2014 | Goyal et al. |
| 9,003,159 B2 | 4/2015 | Deshkar |
| 9,256,542 B1 | 2/2016 | Flower |
| 9,292,564 B2 | 3/2016 | Kamp et al. |
| 9,361,232 B2 | 6/2016 | Umamageswaran et al. |
| 9,405,694 B2 | 8/2016 | Goyal et al. |
| 9,514,187 B2 | 12/2016 | Ziauddin |
| 9,703,706 B2 | 7/2017 | Bagal et al. |
| 2002/0026448 A1 | 2/2002 | Bird et al. |
| 2002/0052914 A1 | 5/2002 | Zalewski et al. |
| 2002/0059287 A1 | 5/2002 | Karasudani |
| 2003/0115324 A1 | 6/2003 | Blumenau |
| 2004/0033803 A1 | 2/2004 | Varonen et al. |
| 2004/0054860 A1 | 3/2004 | Dixit |
| 2004/0117396 A1 | 6/2004 | Avadhanam et al. |
| 2004/0117441 A1 | 6/2004 | Liu et al. |
| 2004/0148486 A1 | 7/2004 | Burton |
| 2004/0215883 A1 | 10/2004 | Bamford et al. |
| 2004/0225845 A1 | 11/2004 | Kruckemyer et al. |
| 2004/0230753 A1 | 11/2004 | Amri |
| 2004/0254943 A1 | 12/2004 | Malcom |
| 2005/0086267 A1 | 4/2005 | Avadhanam et al. |
| 2005/0160224 A1 | 7/2005 | Cuomo et al. |
| 2005/0193160 A1 | 9/2005 | Bhatte et al. |
| 2005/0204112 A1 | 9/2005 | O'Connor et al. |
| 2005/0210202 A1 | 9/2005 | Choubal et al. |
| 2005/0223174 A1 | 10/2005 | Mogi |
| 2006/0064441 A1 | 3/2006 | Yamamoto |
| 2006/0106890 A1 | 5/2006 | Paul et al. |
| 2006/0143256 A1 | 6/2006 | Galchev |
| 2006/0209444 A1 | 9/2006 | Song |
| 2006/0218123 A1 | 9/2006 | Chowdhuri et al. |
| 2006/0248131 A1 | 11/2006 | Marwinski et al. |
| 2006/0271605 A1 | 11/2006 | Petruzzo |
| 2006/0271740 A1 | 11/2006 | Mark |
| 2007/0067575 A1 | 3/2007 | Morris et al. |
| 2007/0078914 A1 | 4/2007 | Correl |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0104329 A1 | 5/2008 | Gaither et al. |
| 2008/0235479 A1 | 9/2008 | Scales |
| 2008/0281784 A1 | 11/2008 | Zane et al. |
| 2009/0164536 A1 | 6/2009 | Nasre et al. |
| 2009/0164733 A1 | 6/2009 | Kim et al. |
| 2009/0182960 A1 | 7/2009 | Crockett |
| 2009/0193189 A1 | 7/2009 | Carswell et al. |
| 2009/0248871 A1 | 10/2009 | Takase et al. |
| 2009/0254521 A1* | 10/2009 | Raman .................. H03M 7/40 |
| 2009/0276654 A1 | 11/2009 | Butterworth et al. |
| 2010/0017556 A1 | 1/2010 | Chin et al. |
| 2010/0070448 A1 | 3/2010 | Omoigui |
| 2010/0122026 A1 | 5/2010 | Umamageswaran et al. |
| 2010/0158486 A1 | 6/2010 | Moon |
| 2010/0161567 A1 | 6/2010 | Makela |
| 2010/0185817 A1 | 7/2010 | Magenheimer |
| 2010/0199042 A1 | 8/2010 | Bates |
| 2010/0205367 A1 | 8/2010 | Ehrlich |
| 2010/0274962 A1 | 10/2010 | Moesk |
| 2011/0016157 A1 | 1/2011 | Bear et al. |
| 2011/0022801 A1 | 1/2011 | Flynn |
| 2011/0029569 A1 | 2/2011 | Ganesh et al. |
| 2011/0040861 A1 | 2/2011 | Van Der Merwe |
| 2011/0066791 A1 | 3/2011 | Goyal |
| 2011/0113036 A1 | 5/2011 | Idicula et al. |
| 2011/0137940 A1 | 6/2011 | Gradin et al. |
| 2011/0153719 A1 | 6/2011 | Santoro |
| 2011/0173325 A1 | 7/2011 | Cherian et al. |
| 2011/0191522 A1 | 8/2011 | Condict |
| 2011/0191543 A1 | 8/2011 | Craske et al. |
| 2011/0238899 A1 | 9/2011 | Yano |
| 2011/0258376 A1 | 10/2011 | Young |
| 2011/0320804 A1 | 12/2011 | Chan et al. |
| 2012/0005158 A1 | 1/2012 | Bhatt et al. |
| 2012/0117038 A1 | 5/2012 | Ganesh et al. |
| 2012/0166729 A1* | 6/2012 | Donley ................ G06F 12/084 711/122 |
| 2012/0173515 A1 | 7/2012 | Chanho et al. |
| 2012/0173774 A1 | 7/2012 | Lee |
| 2012/0221768 A1 | 8/2012 | Bagal et al. |
| 2012/0290786 A1* | 11/2012 | Mesnier .............. G06F 12/0866 711/113 |
| 2012/0296883 A1 | 11/2012 | Ganesh |
| 2013/0086330 A1 | 4/2013 | Baddepudi |
| 2013/0212332 A1 | 8/2013 | Umamageswaran |
| 2013/0290598 A1* | 10/2013 | Fiske .................... G06F 3/0625 711/103 |
| 2014/0089565 A1 | 3/2014 | Lee |
| 2014/0108751 A1 | 4/2014 | Brown et al. |
| 2014/0149638 A1 | 5/2014 | Jain |
| 2014/0281167 A1 | 9/2014 | Danilak |
| 2014/0281247 A1 | 9/2014 | Loaiza et al. |
| 2014/0281272 A1 | 9/2014 | Loaiza et al. |
| 2015/0006813 A1 | 1/2015 | Goyal et al. |
| 2015/0012690 A1 | 1/2015 | Bruce |

(56) References Cited

U.S. PATENT DOCUMENTS

| | | | |
|---|---|---|---|
| 2015/0019834 A1* | 1/2015 | Loh | G06F 12/023 711/208 |
| 2015/0088822 A1* | 3/2015 | Raja | G06F 17/30324 707/625 |
| 2015/0089121 A1 | 3/2015 | Coudhury et al. | |
| 2015/0089138 A1 | 3/2015 | Tao et al. | |
| 2015/0089140 A1 | 3/2015 | Sridharan et al. | |
| 2015/0149479 A1 | 5/2015 | Geringer et al. | |
| 2016/0026579 A1* | 1/2016 | Samanta | G06F 12/0893 711/136 |
| 2016/0188414 A1* | 6/2016 | Jayakumar | G06F 1/30 711/103 |
| 2017/0177488 A1* | 6/2017 | Leung | G06F 12/0891 |

FOREIGN PATENT DOCUMENTS

| | | |
|---|---|---|
| WO | WO 93/18461 | 9/1993 |
| WO | WO 2012/032184 A1 | 3/2012 |

OTHER PUBLICATIONS

Baddepudi, U.S. Appl. No. 13/288,785, filed Nov. 3, 2011, Advisory Action, dated Dec. 29, 2017.

Liu, Xin et al. "CLIC: Client-Informed Caching for Storage Servers." Feb. 2009. USENIX. FAST '09. pp. 297-310.

"In the Lab: Full ESX/vMotion Test Lab in a Box, Part 2", dated Aug. 2009, https://blog.solori.net/2009/08/17/in-the-lab-full-escmotion-test-lab-in-a-box-part-2/.

"Page replacement in Linux 2.4 memory management." Jun. 2001. USENIX; FREENIX 2001.

Ailamaki, Anastassia, et al, "Weaving Relations for Cache Performance," Proceedings of the 27th International Conference on Very Large Data Bases, Rome, Italy, Sep. 11-14, 2001, 14 pages.

Chandrasekaran, Sashikanth and Bamford, Roger, "Shared Cache—The Future of Parallel Databases." Mar. 2003. ICDE'03. pp. 840-850.

Dittrich et al., "Towards a One Size Fits All Database Architecture" Proceedings of the 5th Biennial Conference on Innovative Data Systems Research, dated Jan. 6, 2011, 4 pages.

Elmasri, et al., "Fundatmentals of Database Systems," Third Edition, Addison-Wesley Longman, 2000, pp. 32, 70, 118, 131-132, 134, 155-159, 170, 252-254, 558, 569-573, 591-592, and 789-790 (26 pgs).

Hennessy, John L., and Patterson, David A., Computer Architecture: A Quantitative Approach. 2007; Elsevier. 4th ed. pp. 287-315.

"In the Lab: Full ESX/vMotion Test Lab in a Box, Part 1", dated Aug. 2009, https://blog.solori.net/2009/08/17/in-the-lab-full-escmotion-test-lab-in-a-box-part-1/.

Koltsidas, Ioannis and Viglas, Stratis D., "The Case for Flash-Aware Multi-Level Caching." 2009. University of Edinburgh. Tech Report EDI-INF-RR-1319.

Yadgar et al., "Karma: Know it All Replacement for a Multilevel Cache", dated Jan. 1, 2007, 16 pages.

Microsoft, "Database Instant File Initialization", SQL Server 2016, https://msdn.microsoft.com/en-us/library/ms175935.aspx, 3 pages.

Peetz, Andreas, "A Myth Busted and an FAQ: ESXi is *not* Based on Linux! But what is it?", dated Aug. 2013, http://www.vfront.de/2013/08a-myth-busted-and-faqe-sxi-is-not based.html.

Schaffner et al., "A Hybrid Row-Column OLTP Database Architecture for Operational Reporting", dated Aug. 24, 2008, 14 pages.

Soundararajan, Gokul et al., "Dynamic Partitioning of the Cache Hierarchy in Shared Data Centers." Aug. 2008. ACM. '08. pp. 635-646.

Venkatarman, Shivakumar, Global Memory Management for Multi-Server Database Systems. 1996. University of Wisconsin—Madison. pp. 24-32.

W3Schools "SQL Update Statement", Wayback Machine darted Apr. 19, 2012, on the internet www.w3schools.com/sql/sql_update.asp>, 1 page.

Wong, Theodore M., and Wilkes, John, "My cache or yours? Making storage more exclusive." Jun. 2002. USENIX. FAST '02.

Jung, Hoyoung et al. "LRU-WSR: Integration of LRU and Write Sequence Reordering for Flash Memory." Aug. 2008. IEEE. IEEE Transactions on Consumer Electronics. vol. 54. pp. 1215-1223.

Baddepudi, U.S. Appl. No. 13/288,785, filed Nov. 3, 2011, Final Office Action, dated Sep. 8, 2017.

* cited by examiner

| CRITERIA 300 | RAM 200A | RAM 200N |
|---|---|---|
| USER-SPECIFIED COMPRESSION LEVEL 302 | LOWER | HIGHER |
| USER-SPECIFIED PRIORITY LEVEL 304 | HIGHER | LOWER |
| USER-SPECIFIED PERCENTAGE OF MF DATA 306 | 25% | 75% |
| ACCESS FREQUENCY OF MF DATA 308 | HIGHER | LOWER |
| AMOUNT OF AVAILABLE MEMORY 310 | WHENEVER POSSIBLE | WHEN RAM 200A IS UNAVAILABLE |
| AGE OF MF DATA 312 | NEWER | OLDER |

FIG. 7

EFFICIENT DATA STORAGE AND RETRIEVAL USING A HETEROGENEOUS MAIN MEMORY

FIELD OF THE DISCLOSURE

Embodiments relate to database systems and, more specifically, to efficient data storage and retrieval using a heterogeneous main memory.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Among the advantages of main memory-based databases is that they enable faster data access and analysis than purely disk-based databases. However, main memory-based databases are limited by main memory capacity, which remains relatively small in comparison to disk capacity. One solution is to use a computing device with a high-capacity main memory. However, such devices are very expensive, thereby making their use cost-prohibitive. Another solution is to effectively increase main memory capacity by using a cluster of computing devices. However, this distributed architecture would instead be limited by the speed of the interconnect.

Thus, there is a need for a cost-effective approach to increasing main memory capacity for a single database server.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second memory may be so named although, in reality, it may correspond to a first, second, and/or third memory.

General Overview

Main memory typically includes one or more volatile memory units. Main memory capacity may be increased based on extending the main memory to include one or more relatively high-density memory units. In some example embodiments, each of the one or more relatively high-density memory units may be a non-volatile memory unit that is priced similarly to a relatively low-density volatile memory unit. Thus, the main memory may be extended to include at least two memory types, each memory type exhibiting a different memory latency.

Since the memory types have different performance characteristics, efficient data storage and retrieval may involve organizing the memory types into a hierarchy. In some example embodiments, a first tier of the hierarchy may include low-density, low-latency memory; and a second tier may include high-density, high-latency memory. Thus, storing data in main memory may involve selecting a particular tier based on one or more criteria, which may include one or more user-specified criteria, one or more characteristics of the data, and/or an amount of memory available for a particular memory type.

General Architecture

Figure 1:
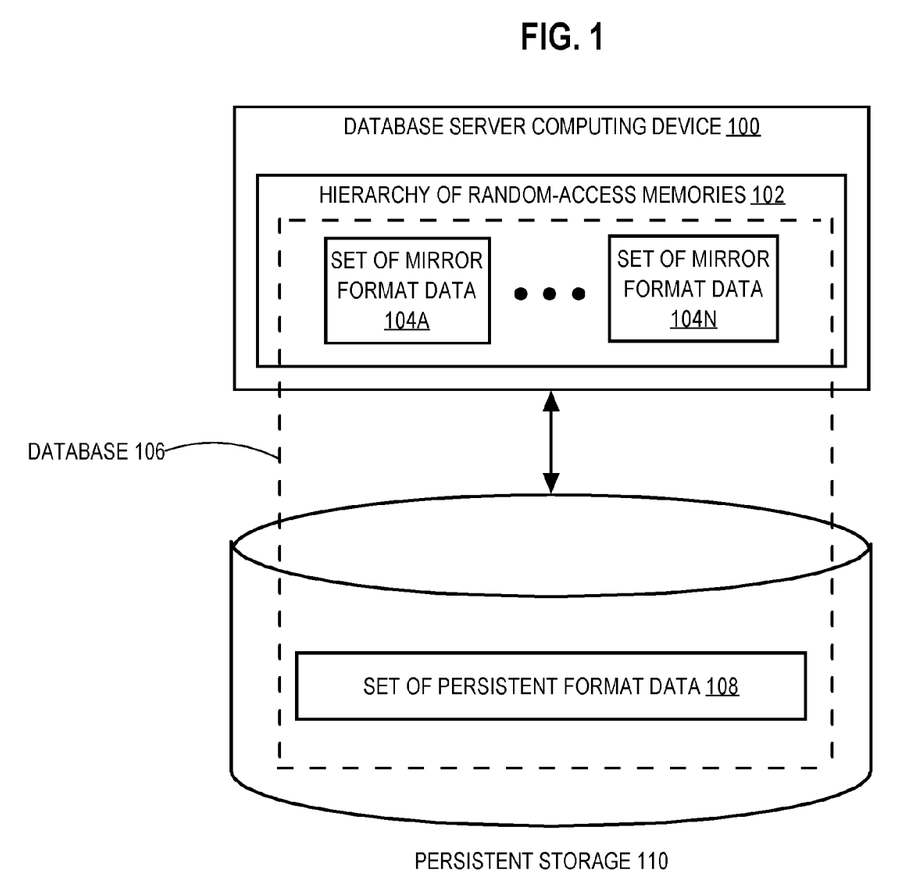
FIG. 1 depicts an example computer architecture on which embodiments may be implemented.

FIG. 1 depicts an example computer architecture on which embodiments may be implemented. Referring to FIG. 1, database server computing device 100 includes hierarchy of random-access memories (RAMs) 102 that further includes sets of mirror format (MF) data 104A-N. The label "N" in "104N," and in any other reference numeral herein, connotes that any number of items may be present or used in embodiments, as in "1 to n items". Database server computing device 100 is communicatively coupled to persistent storage 110. Persistent storage 110 includes at least part of database 106, which further includes set of persistent format (PF) data 108.

Database 106 may be one or more systems, files, and/or data structures that store data. For example, database 106 may include a virtual disk and/or a set of physical disks. Database 106 may reside in volatile and/or non-volatile storage. Example storages include main memory and/or one or more hard disks. As used herein, "non-volatile" refers to a characteristic of a memory that retains data in the absence of any form of electrical power, including external or battery backup. Examples of non-volatile memory include e-prom memory, flash memory, and disk memory. Non-volatile memory does not include volatile memory for which power is retained by a battery backup in the absence of another external power source. For example, volatile memory coupled to a board with an embedded battery-backup is not non-volatile memory, because without the power provided by a battery, the volatile memory does not retain data.

In the example of FIG. 1, database 106 is maintained, at least in part, on persistent storage 110. Data stored on persistent storage 110 remains stored even when a failure occurs. Consequently, after a failure, the data on persistent storage 110 may be used to rebuild any lost data.

Database 106 may be maintained on persistent storage 110 in a particular format hereinafter referred to as a "persistent format". In some example embodiments, the persistent format may be a row-major format. Thus, database 106 may be stored on persistent storage 110 as one or more sets of PF data. Accordingly, set of PF data 108 may be a subset of database 106. An example set of PF data 108 is provided below:

| R1C1 | R1C2 | R1C3 |
|------|------|------|
| R2C1 | R2C2 | R2C3 |
| R3C1 | R3C2 | R3C3 |

Additionally, database 106 may be stored, at least in part, in database server computing device 100. Database server computing device 100 may be any computing device that runs a database server. Database 106 is accessible to database server computing device 100, which may store at least a portion of database 106 in a particular format hereinafter referred to as a "mirror format". The mirror format is different from and independent of the persistent format. In some example embodiments, the mirror format may be a column-major format. An example set of MF data 104A is provided below:

| R1C1 |
|------|
| R2C1 |
| R3C1 |

In the example of FIG. 1, database server computing device 100 converts set of PF data 108 into sets of MF data 104A-N and stores sets of MF data 104A-N in hierarchy of RAMs 102. PF data may be converted to MF data and subsequently stored using any of the techniques described in U.S. patent application Ser. No. 14/337,179, filed Jul. 21, 2014, the entire contents of which are incorporated herein by reference. Thus, MF data may be a cached version of PF data that is stored in a different format. This different format may enable more efficient processing of data in some situations. Thus, MF data may be accessed when a database server determines that it would be more efficient to perform an operation on MF data as opposed to PF data.

Figure 2:
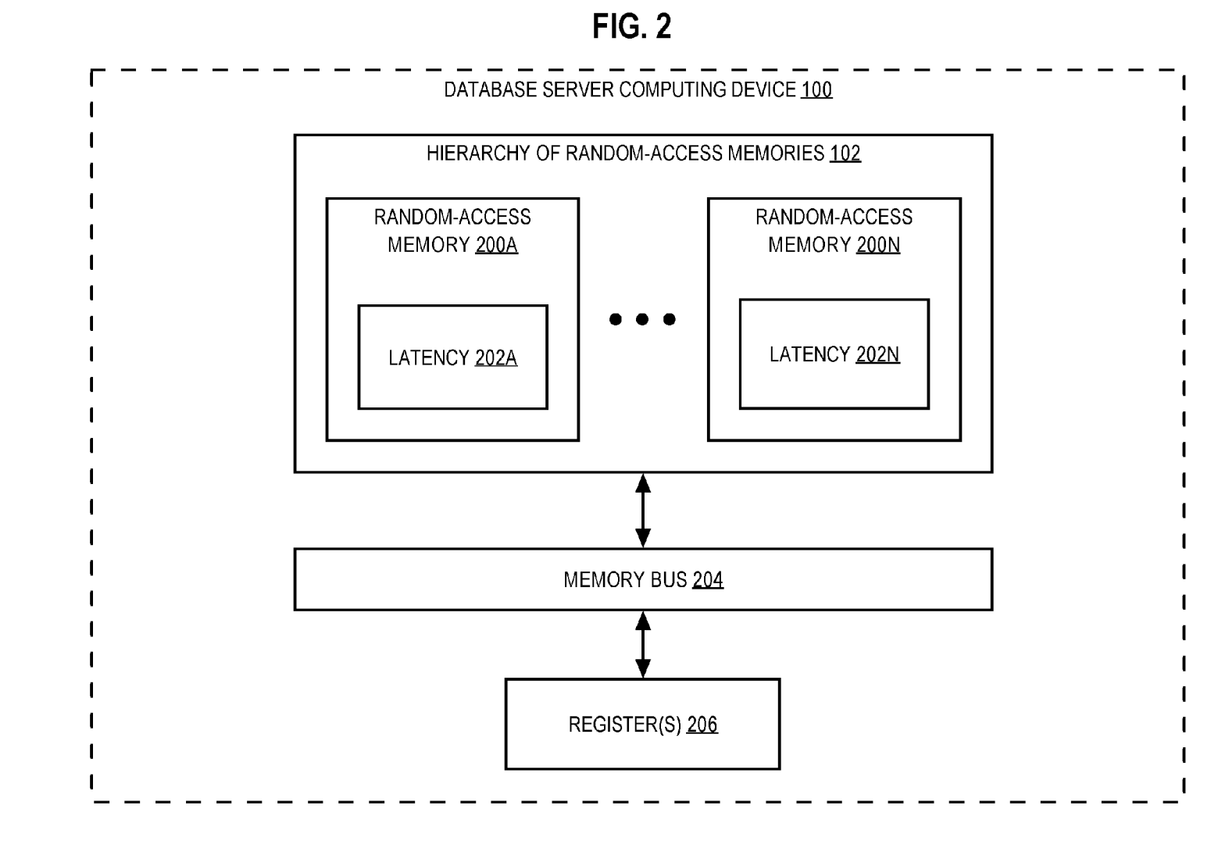
FIG. 2 depicts a detailed view of a database server computing device, in an example embodiment.

FIG. 2 depicts a detailed view of a database server computing device, in an example embodiment. Referring to FIG. 2, database server computing device 100 includes hierarchy of RAMs 102, memory bus 204, and register(s) 206. Hierarchy of RAMs 102 includes RAMs 200A-N, which correspond to latencies 202A-N.

Main memory of database server computing device 100 includes hierarchy of RAMs 102. Each RAM in hierarchy of RAMs 102 is a collection of one or more memory units of a particular type. Thus, each RAM is associated with a different memory latency. For example, RAM 200A may be a low-latency byte-addressable volatile memory, and RAM 200N may be a high-latency byte-addressable non-volatile memory.

Each of latencies 202A-N corresponds to an amount of time that is typically involved for one or more processors to retrieve MF data from a respective RAM. In the example of FIG. 2, copying a memory address range of MF data from any of RAMs 200A-N into register(s) 206 involves transmitting the memory address range via memory bus 204 to register(s) 206 of the one or more processors. Accordingly, any difference in memory latency is attributable to differing characteristics of RAMs 200A-N. For example, RAM 200A may store uncompressed MF data, whereas RAM 200N stores compressed MF data.

Byte-addressable memory is distinguishable from other forms of storage. A byte is eight bits and is the minimum amount of data that may be addressed, retrieved from memory, or written to in byte-addressable memory. Thus, to manipulate a bit in a byte, a byte containing the bit must be fetched to register(s) 206 by an instruction referencing the byte (or word containing the byte) and manipulated according to an instruction. In contrast, the minimum size for a unit of block-addressable memory is a block. A block comprises multiple bytes and multiple words. For block-addressable memory, a block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface, and then the bit or the byte is manipulated in the byte-addressable memory.

RAM is distinguishable from read-only memory (ROM) in that data in RAM can be overwritten. As used herein, overwriting data refers to replacing the data with new data without first having to erase the data. Thus, as used herein, RAM refers to byte-addressable memory that can be overwritten.

Selecting a Memory for Storing Data

Figure 3:
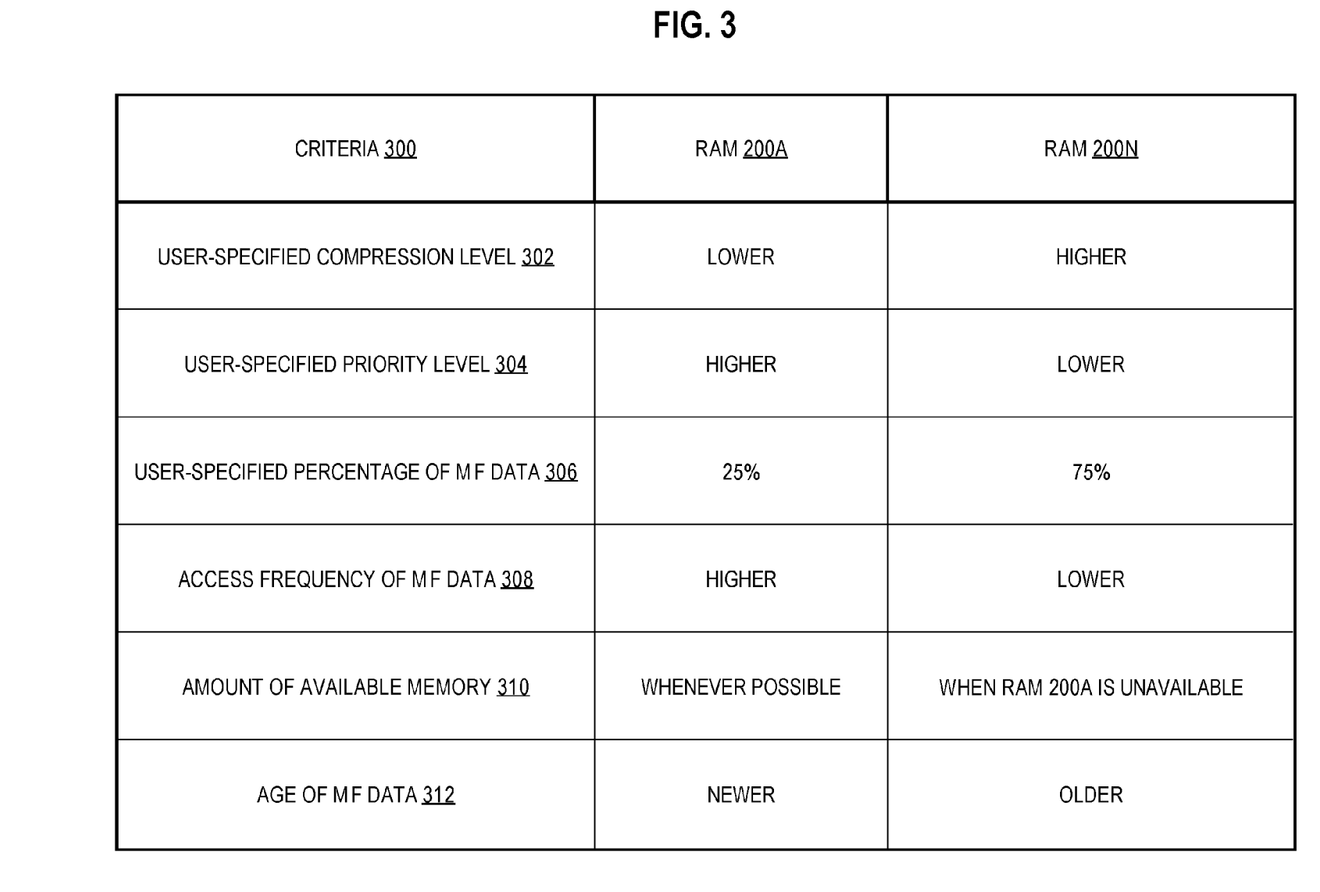
FIG. 3 is a table that depicts an approach for selecting a particular memory based on one or more criteria.

Database server computing device 100 may store sets of MF data 104A-N in RAMs 200A-N based on selecting a particular RAM to store each set of MF data. FIG. 3 is a table that depicts an approach for selecting a particular memory based on one or more criteria. Referring to FIG. 3, criteria 300 include user-specified compression level 302, user-specified priority level 304, user-specified percentage of MF data 306, access frequency of MF data 308, amount of available memory 310, and age of MF data 312.

In the example of FIG. 3, hierarchy of RAMs 102 includes at least two types of memory units—RAM 200A and RAM 200N. RAMs 200A and 200N may correspond to a low-latency memory and a high-latency memory, respectively. Database server computing device 100 may select a particular RAM according to user input. Additionally or alternatively, database server computing device 100 may automatically select a particular RAM to store a particular set of MF data.

Memory Selection Based on User Input

In some example embodiments, database server computing device 100 may receive the user input as a database statement. For example, database server computing device 100 may receive user-specified compression level 302 as the database statement "ALTER TABLE name MODIFY PARTITIONxIN MEMORY MEMCOMPRESS FOR CAPACITY HIGH". In this example, the particular set of MF data is a database table partition that has been modified to indicate a high compression level. In response, database server computing device 100 may highly compress the particular set of MF data prior to storing it in a particular RAM.

According to FIG. 3, RAM 200A typically stores MF data that is uncompressed or that is compressed at a lower level, whereas RAM 200N typically stores MF data that is compressed at a higher level. Thus, RAM 200A may have a lower memory latency than RAM 200N, because it may be necessary to decompress MF data stored in RAM 200N prior to accessing the MF data. However, "lower" and "higher" compression levels may be relative terms categorizing user preferences that are constrained by one or more other criteria. In other words, database server computing device 100 may honor user-specified compression levels so long as there is enough available memory to do so. For example, database server computing device 100 may store highly compressed MF data in RAM 200N until it is full; if there is enough available memory in RAM 200A, database server computing device 100 may then store any other highly compressed MF data in RAM 200A.

Additionally or alternatively, the user input may specify a priority level for the particular set of MF data. For example, database server computing device 100 may receive user-specified priority level 304 as the database statement "ALTER TABLE name MODIFY PARTITIONxIN MEMORY PRIORITY HIGH". In this example, the particular set of MF data is a database table partition that has been modified to indicate a high priority level. According to FIG. 3, MF data with a higher priority level is typically stored in RAM 200A, where a relatively lower memory latency may enable relatively faster access. In contrast, RAM 200N typically stores MF data with a lower priority level or without any priority level.

However, "higher" and "lower" priority levels may be relative terms categorizing user preferences that are constrained by one or more other criteria. In other words, database server computing device 100 may honor user-specified priority levels so long as there is enough available memory to do so. In some example embodiments, database server computing device 100 may initially store MF data in RAM 200A until it is full. Subsequently, database server computing device 100 may move some of the MF data into RAM 200N based on user-specified priority levels. For example, if a highest priority level specified for the MF data is "PRIORITY LOW", database server computing device 100 may first move any MF data thus marked into RAM 200N.

Additionally or alternatively, a user may specify a proportional amount of MF data to be stored in a particular RAM. For example, database server computing device 100 may receive a database statement including user-specified percentage of MF data 306 as 25% RAM 200A and/or 75% RAM 200N. Thus, if MF data is one terabyte in total, database server computing device 100 may store 250 gigabytes of MF data in RAM 200A and 750 gigabytes of MF data in RAM 200N. In other words, database server computing device 100 may receive user input specifying that RAM 200N's capacity or density should be three times that of RAM 200A.

Automatic Memory Selection

In some example embodiments, database server computing device 100 may automatically select a particular RAM based on access frequency of MF data 308. According to FIG. 3, RAM 200A typically stores MF data that is accessed at a relatively higher frequency, whereas RAM 200N typically stores MF data that remains unaccessed or that is accessed at a relatively lower frequency. Significantly, storing frequently accessed MF data in RAM 200A contributes to efficient execution of database statements. For example, accessing MF data in RAM 200N may involve an overhead cost of first decompressing the MF data. Frequently accessing the MF data multiplies this overhead cost by decompressing the MF data for each access. Thus, storing the MF data in RAM 200A may avoid this overhead cost based on storing the MF data in an uncompressed state.

As will be described in greater detail below, database server computing device 100 may monitor usage statistics, including access frequency, for MF data at any level of granularity. For example, the particular set of MF data may correspond to a database table partition, a data block, or any other portion of database 106. Based on the usage statistics, database server computing device 100 may move the MF data from RAM 200N to RAM 200A or vice versa.

Additionally or alternatively, database server computing device 100 may automatically select a particular RAM based on amount of available memory 310. In the example of FIG. 3, RAM 200A typically stores MF data whenever possible, and RAM 200N typically stores MF data when RAM 200A is unavailable for further storage. However, in some example embodiments, MF data may be preferentially stored in RAM 200N with "spill-over" MF data being stored in RAM 200A when RAM 200N is full. Thus, a maximum amount of a particular type of data may be stored in the RAM that is most suitable for storing the particular type of data.

Previously occupied memory space may become available when main memory is populated with new MF data. For example, to make space to store a new database table partition in RAM 200A database server computing device 100 may move some MF data from RAM 200A to RAM 200N. In some example embodiments, however, database server computing device 100 may move some MF data from RAM 200N to RAM 200A to accommodate new MF data in RAM 200N.

Additionally or alternatively, database server computing device 100 may automatically select a particular RAM based on age of MF data 312. According to FIG. 3, RAM 200A typically stores relatively newer MF data, whereas RAM 200N typically stores older MF data. For example, RAM 200A may store MF data that is two days old or newer, and RAM 200N may store MF data that is older than two days. In some example embodiments, when main memory is populated with new MF data, database server computing device 100 may move some MF data from RAM 200A to RAM 200N.

Typically, newer MF data changes more frequently than older MF data. Thus, newer MF data is optimally stored in RAM 200A, where the newer MF data may efficiently undergo transactional processing. For example, RAM 200A may store MF data in an uncompressed state that is conducive to processor-bound operations, such as binary searches, parallel computing, etc. In contrast, older MF data is optimally stored in RAM 200N, where the older MF data may undergo analytical processing. For example, RAM 200N may store, in a compressed state, MF data that changes infrequently if at all. Despite compression and decompression costs, performing memory-bound operations on the MF data is more efficient than performing storage-bound operations. Furthermore, higher compression levels in RAM 200N enable more database statements to be executed within a same amount of memory bandwidth. For example, ten times compression enables ten times more queries before memory bus 204 becomes saturated.

Automatically Moving Data Within a Hierarchy of Memories

Figure 4:
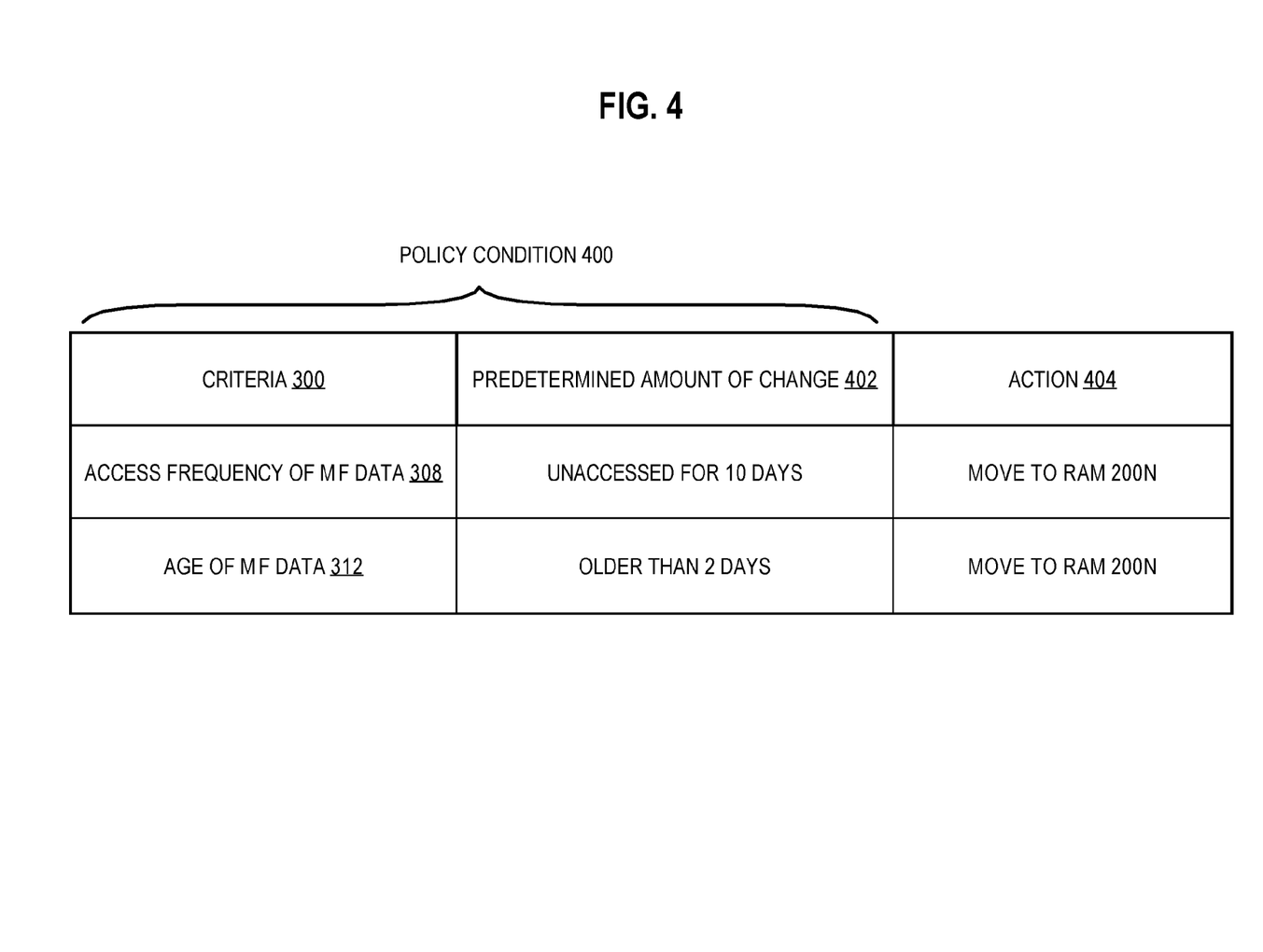
FIG. 4 is a table that depicts an approach for performing an action based on one or more policy conditions.

As mentioned above, database server computing device 100 may automatically select a particular RAM to store a particular set of MF data. In some example embodiments, this automatic selection may involve automatically moving the particular set of MF data from a first RAM to a second RAM if one or more policy conditions are satisfied. FIG. 4 is a table that depicts an approach for performing an action based on one or more policy conditions. Referring to FIG. 4, the table correlates policy condition 400 with action 404. Policy condition 400 includes criteria 300 and predetermined amount of change 402. Criteria 300 includes access frequency of MF data 308 and age of MF data 312.

In some example embodiments, database server computing device 100 performs action 404 when policy condition 400 is satisfied. Policy condition 400 may be defined by a user. Performing action 404 involves automatically moving MF data between different RAMs in hierarchy of RAMs 102. Policy condition 400 is satisfied when predetermined amount of change 402 is detected with regard to one of criteria 300.

In the example of FIG. 4, database server computing device 100 automatically moves, from RAM 200A to RAM 200N, a particular set of MF data that is unaccessed for ten days. Additionally or alternatively, database server computing device 100 automatically moves, from RAM 200A to RAM 200N, a particular set of MF data that is older than two days.

Indicating Satisfied Policy Conditions

Figure 5:
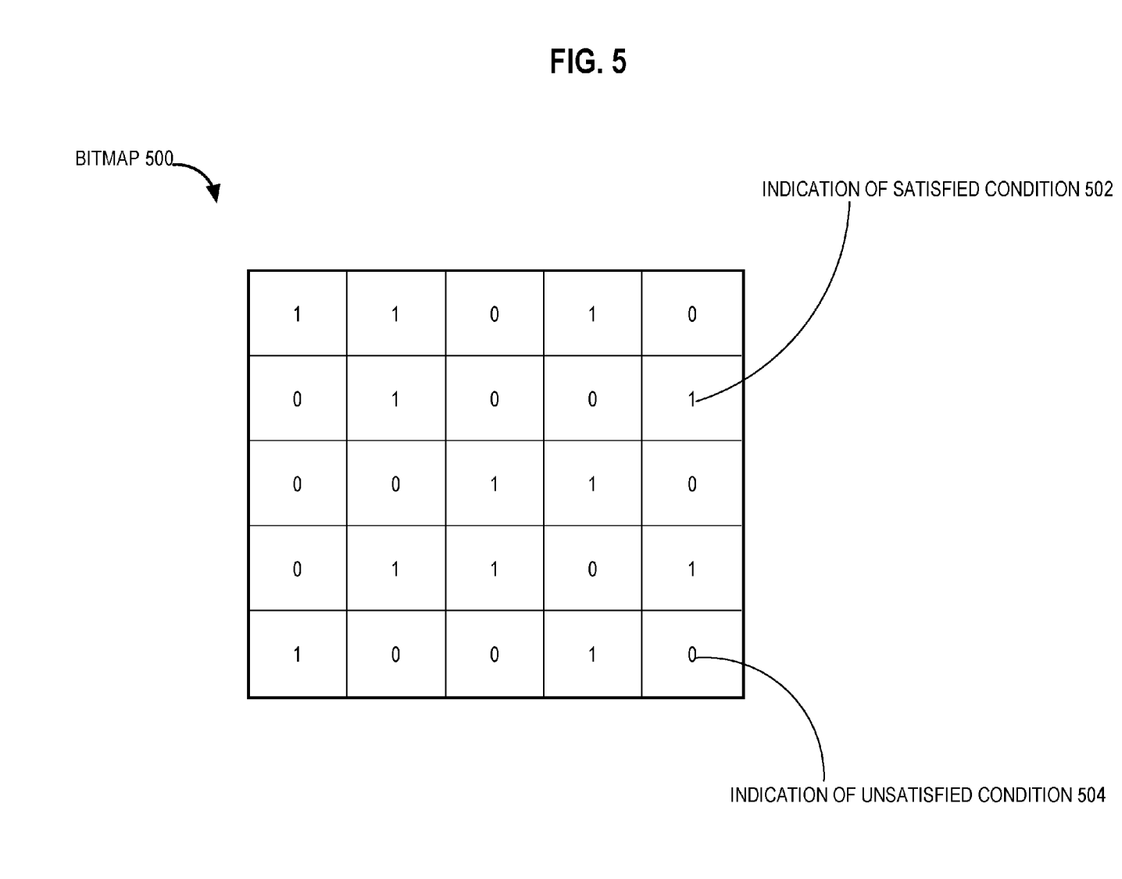
FIG. 5 depicts an example bitmap that indicates satisfied policy conditions.

Database server computing device 100 may determine that one or more policy conditions are satisfied based on one or more bitmaps. FIG. 5 depicts an example bitmap that indicates satisfied policy conditions. Referring to FIG. 5, bitmap 500 includes indication of satisfied condition 502 and indication of unsatisfied condition 504.

Database server computing device 100 may monitor MF data and collect statistics about the MF data. The statistics may be stored as bitmap 500. Each bit in bitmap 500 may represent a database table partition, a data block, or any other portion of database 106. Thus, bitmap 500 may indicate that a particular policy condition has been satisfied for one or more database table partitions, one or more data blocks, or one or more of any other portion of database 106. For example, each bit in bitmap 500 may correspond to a block of MF data, and bitmap 500 may correspond to a policy condition that enables moving MF data from RAM 200A to RAM 200N if the MF data is older than five days.

Bitmap 500 may indicate a satisfied policy condition based on flipped bits. In the example of FIG. 5, indication of satisfied condition 502 corresponds to the digit "1", and indication of unsatisfied condition 504 corresponds to the digit "0". For example, bitmap 500 includes indication of satisfied condition 502 in the fifth bit of the second row. In some example embodiments, each row of bitmap 500 may correspond to a memory address range, and each column of bitmap 500 may correspond to a subset of a memory address range. Each subset may include one or more memory addresses. For example, the second row of bitmap 500 may correspond to the memory address range of "200-299", and the fifth bit of the second row may correspond to the memory address range of "280-299". When database server computing device 100 processes indication of satisfied condition 502, database server computing device 100 may automatically move corresponding MF data to a different RAM. For example, based on bitmap 500, database server computing device 100 may move MF data stored in the memory address range of "280-299".

Process Overview

Figure 6:
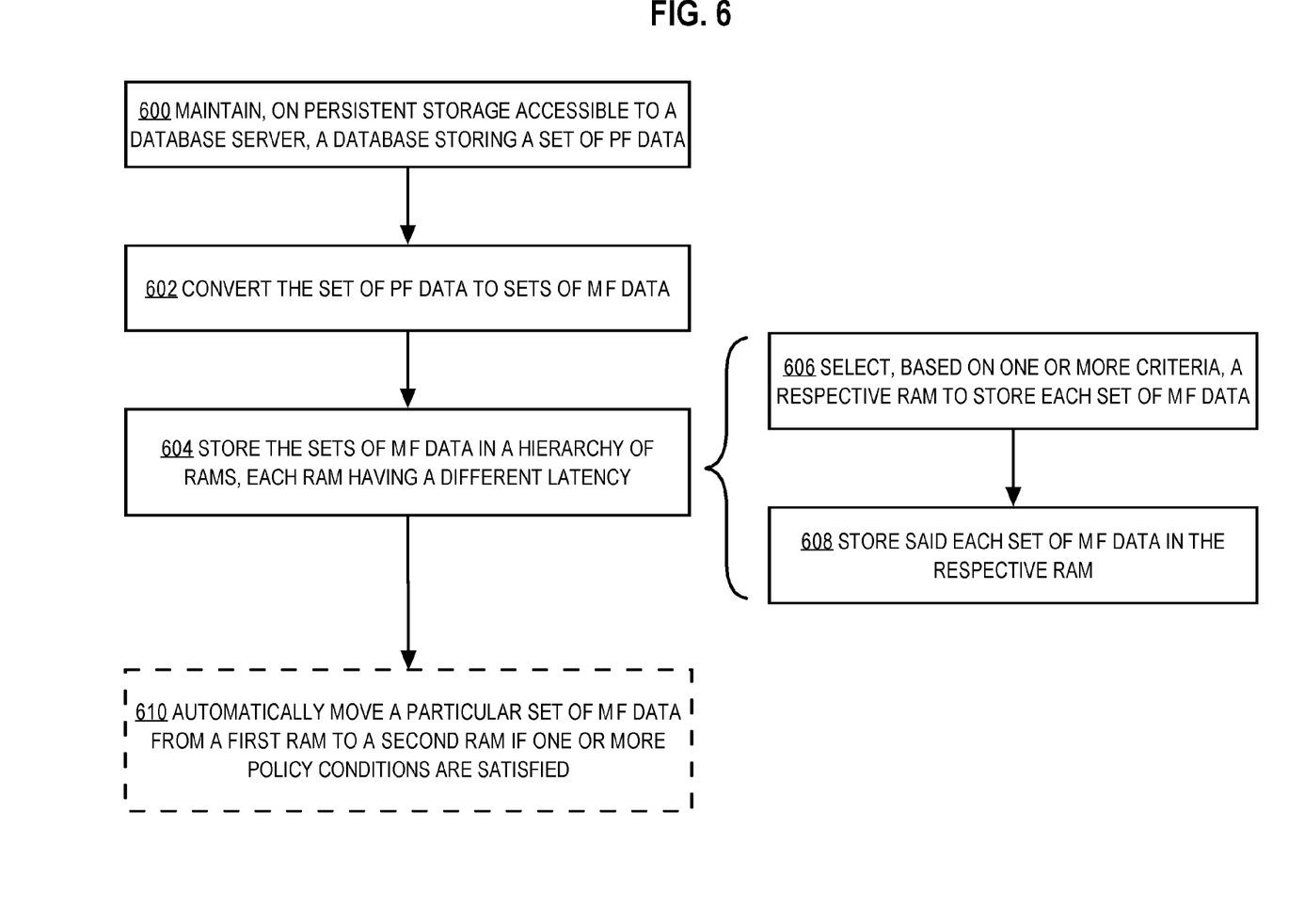
FIG. 6 is a flow diagram that depicts an approach for storing data in a hierarchy of memories.

FIG. 6 is a flow diagram that depicts an approach for storing data in a hierarchy of memories. At block 600, a database is maintained on persistent storage accessible to a database server. The database stores a set of PF data on the persistent storage.

At block 602, the database server converts the set of PF data to sets of MF data. PF data is stored in a different format from MF data. For example, PF data may correspond to one or more rows of a database table, whereas MF data may correspond to one or more columns of the database table. PF data and/or MF data may correspond to one or more database table partitions, one or more data blocks, or one or more of any other portion of a database.

At block 604, the database server stores the sets of MF data in a hierarchy of RAMs. Each RAM in the hierarchy of RAMs has an associated latency that is different from a latency associated with any other RAM in the hierarchy. For example, a first RAM may be a low-latency volatile RAM, and a second RAM may be a high-latency non-volatile RAM. Block 604 includes blocks 606 and 608 as subprocesses that may be performed concurrently and/or sequentially.

At block 606, the database server selects a respective RAM to store each set of MF data. Selecting a particular RAM may be based on one or more criteria. The database server may select a particular RAM according to user input. Additionally or alternatively, the database server may automatically select a particular RAM based on available memory and/or one or more data characteristics, such as age and access frequency.

At block 608, the database server stores each set of MF data in a corresponding RAM. For example, a user may anticipate frequent access of a particular set of MF data, so the user may provide an indication that the particular set of MF data is "high priority" data. In response to receiving the indication, the database server may store the particular set of MF data in a low-latency RAM.

At optional block 610, the database server may automatically move a particular set of MF data from a first RAM to a second RAM if one or more policy conditions are satisfied. The one or more policy conditions may be based on a threshold amount of change that is detected in one or more data characteristics. For example, the database server may move a particular data block from a low-latency RAM to a high-latency RAM when the particular data block corresponds to data that is older than two days.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
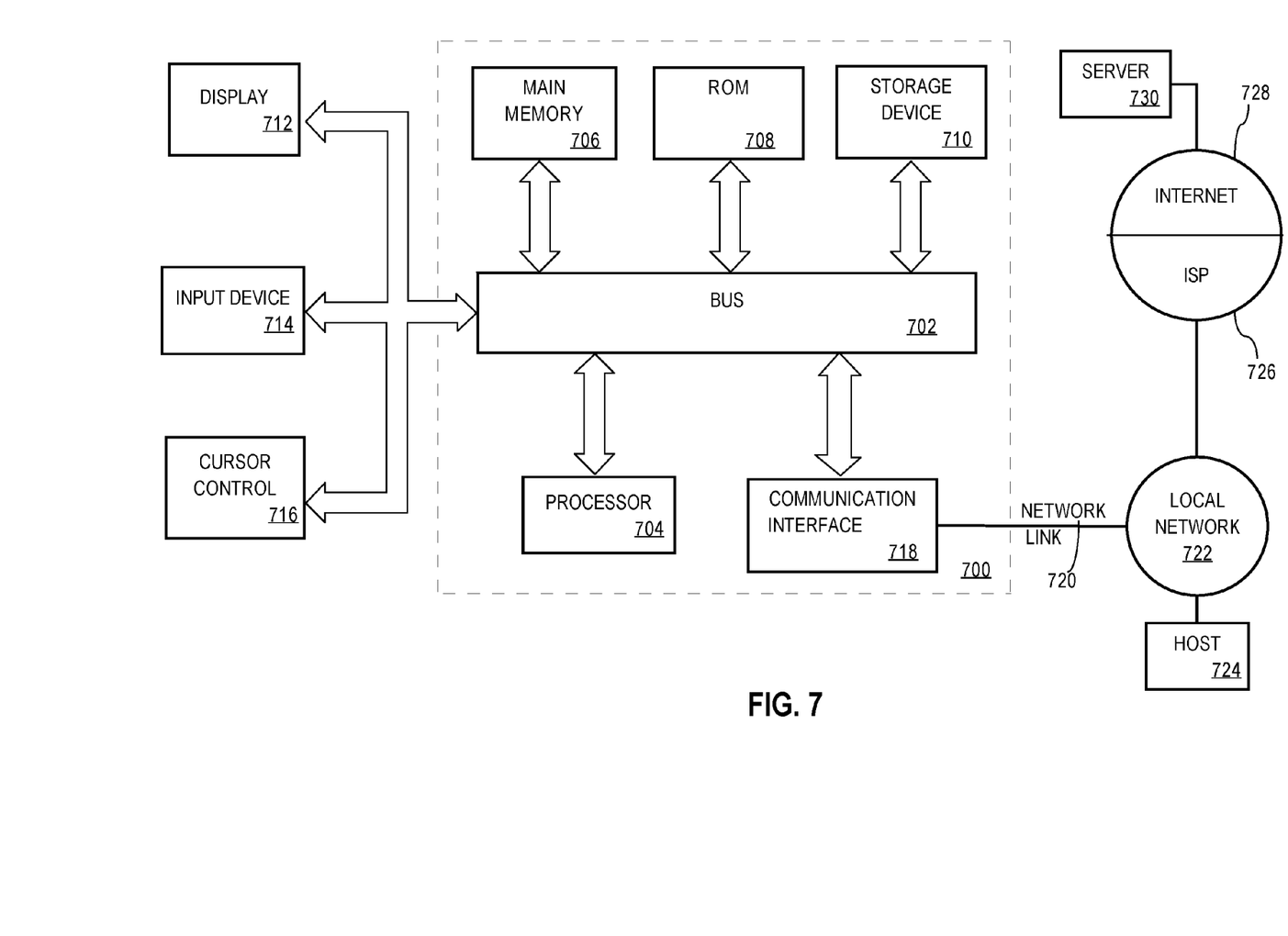
FIG. 7 depicts a computer system upon which an embodiment may be implemented.

For example, FIG. 7 is a block diagram that illustrates a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
a database server maintaining a database, said database server comprising one or more central processing units (CPUs);
wherein said database includes a plurality of database tables stored in a plurality of data blocks on block-addressable persistent storage devices;
said database server storing, in a hierarchy of random-access memories (RAMs), sets of mirror format (MF) data produced by converting data in said plurality of data blocks to a mirror format, each RAM in said hierarchy of RAMs being byte addressable memory having an address space referenceable by software instructions executed by said one or more CPUs, each RAM in said hierarchy of RAMs having an associated latency different from a latency associated with any other RAM in said hierarchy of RAMs;
wherein each set of MF data of said sets of MF data store, in column-major form, data from a plurality of columns of said plurality of database tables;
wherein, for each set of MF data of said sets of MF data, storing includes:
selecting based on one or more criteria, by said database server, a respective RAM from said hierarchy to store said each set of MF data;
storing, by said database server, said each set of MF data in said respective RAM.

2. The method of claim 1, further comprising, after storing said each set of MF data in said respective RAM, automatically moving a particular set of MF data from a first RAM to a second RAM if one or more policy conditions are satisfied, said first RAM and said second RAM being different RAMs in said hierarchy of RAMs.

3. The method of claim 2, wherein satisfaction of said one or more policy conditions is indicated by one or more bitmaps.

4. The method of claim 2, wherein said one or more policy conditions comprise a predetermined amount of change in an access frequency of said particular set of MF data.

5. The method of claim 2, wherein said one or more policy conditions comprise a predetermined amount of change in an age of said particular set of MF data.

6. The method of claim 2, wherein said one or more policy conditions comprise a predetermined amount of change in an amount of available memory in said second RAM.

7. The method of claim 1, wherein said one or more criteria comprise a user-specified compression level for a particular set of MF data of said sets of MF data.

8. The method of claim 1, wherein said one or more criteria comprise a user-specified priority level for a particular set of MF data of said sets of MF data.

9. The method of claim 1, wherein said one or more criteria comprise a user-specified percentage of said sets of MF data to be stored in a particular RAM in said hierarchy of RAMs.

10. The method of claim 1, wherein said hierarchy of RAMs comprises a volatile RAM and a non-volatile RAM.

11. One or more non-transitory storage media storing a set of instructions which, when executed by one or more computing devices, cause:
a database server maintaining a database, said database server comprising one or more central processing units (CPUs);
wherein said database includes a plurality of database tables stored in a plurality of data blocks on block-addressable persistent storage devices;
said database server storing, in a hierarchy of random-access memories (RAMs), sets of mirror format (MF) data produced by converting data in said plurality of data blocks to a mirror format, each RAM in said hierarchy of RAMs being byte addressable memory having an address space referenceable by software instructions executed by said one or more CPUs, each RAM in said hierarchy of RAMs having an associated latency different from a latency associated with any other RAM in said hierarchy of RAMs;
wherein each set of MF data of said sets of MF data store, in column-major form, data from a plurality of columns of said plurality of database tables;
wherein, for each set of MF data of said sets of MF data, storing includes:
selecting based on one or more criteria, by said database server, a respective RAM from said hierarchy to store said each set of MF data;
storing, by said database server, said each set of MF data in said respective RAM.

12. The one or more non-transitory storage media of claim 11, wherein said set of instructions further comprises instructions which, when executed by said one or more computing devices, cause:
after storing said each set of MF data in said respective RAM, automatically moving a particular set of MF data from a first RAM to a second RAM if one or more policy conditions are satisfied, said first RAM and said second RAM being different RAMs in said hierarchy of RAMs.

13. The one or more non-transitory storage media of claim 12, wherein satisfaction of said one or more policy conditions is indicated by one or more bitmaps.

14. The one or more non-transitory storage media of claim 12, wherein said one or more policy conditions comprise a predetermined amount of change in an access frequency of said particular set of MF data.

15. The one or more non-transitory storage media of claim 12, wherein said one or more policy conditions comprise a predetermined amount of change in an age of said particular set of MF data.

16. The one or more non-transitory storage media of claim 12, wherein said one or more policy conditions comprise a predetermined amount of change in an amount of available memory in said second RAM.

17. The one or more non-transitory storage media of claim 11, wherein said one or more criteria comprise a user-specified compression level for a particular set of MF data of said sets of MF data.

18. The one or more non-transitory storage media of claim 11, wherein said one or more criteria comprise a user-specified priority level for a particular set of MF data of said sets of MF data.

19. The one or more non-transitory storage media of claim 11, wherein said one or more criteria comprise a user-specified percentage of said sets of MF data to be stored in a particular RAM in said hierarchy of RAMs.

20. The one or more non-transitory storage media of claim 11, wherein said hierarchy of RAMs comprises a volatile RAM and a non-volatile RAM.

* * * * *

UNITED STATES PATENT AND TRADEMARK OFFICE
CERTIFICATE OF CORRECTION

Page 1 of 1

PATENT NO. : 10,133,667 B2
APPLICATION NO. : 15/257754
DATED : November 20, 2018
INVENTOR(S) : Mukherjee et al.

It is certified that error appears in the above-identified patent and that said Letters Patent is hereby corrected as shown below:

On the Title Page

Column 1, Item (73) under Assignee, Line 1, delete "Orcle" and insert -- Oracle --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*